(12) United States Patent
Bando

(10) Patent No.: US 7,682,220 B2
(45) Date of Patent: Mar. 23, 2010

(54) GLASS-PLATE WORKING APPARATUS

(75) Inventor: Kazuaki Bando, Tokushima (JP)

(73) Assignee: Bando Kiko Co., Ltd., Tokushima-shi (JP)

( * ) Notice: Subject to any disclaimer, the term of this patent is extended or adjusted under 35 U.S.C. 154(b) by 0 days.

(21) Appl. No.: 10/470,772

(22) PCT Filed: Apr. 30, 2002

(86) PCT No.: PCT/JP02/04320

§ 371 (c)(1),
(2), (4) Date: Jul. 31, 2003

(87) PCT Pub. No.: WO03/048056

PCT Pub. Date: Jun. 12, 2003

(65) Prior Publication Data

US 2004/0072514 A1 Apr. 15, 2004

(30) Foreign Application Priority Data

Dec. 6, 2001 (JP) ............................. 2001-373331

(51) Int. Cl.
*B24B 49/00* (2006.01)
(52) U.S. Cl. .................. 451/5; 451/8; 451/11; 451/143; 451/285
(58) Field of Classification Search .................. 451/5, 451/6, 8, 11, 41, 285–289, 139, 143
See application file for complete search history.

(56) References Cited

U.S. PATENT DOCUMENTS 4,519,167 A * 5/1985 Halberschmidt et al. .... 451/127

(Continued)

FOREIGN PATENT DOCUMENTS

DE 34 03 682 C1 8/1985

(Continued)

OTHER PUBLICATIONS

Microfilm of the specification and drawings annexed to the request of Japanese Utility Model Appliction No. 92498/1990 (Laid-open No. 51361/1992) (Babcock-Hitachi Kabushiki Kaisha), Apr. 30, 1992.

(Continued)

*Primary Examiner*—Maurina Rachuba
(74) *Attorney, Agent, or Firm*—Nixon & Vanderhye P.C.

(57) ABSTRACT

An apparatus (1) for removing a film layer on a glass plate includes: a movable base (5) which is movable in an X direction and a Y direction along a glass-plate placing surface (3); a moving means (6) for moving the movable base (5) in the X direction and the Y direction along the glass-plate placing surface (3); a movable base (7) provided on the movable base (5) in such a manner to be movable in a Z direction so as to be capable of moving toward or away from the glass-plate placing surface (3); a moving means (8) for moving the movable base (7) in the Z direction so as to cause the movable base (7) to move toward or away from the glass-plate placing surface (3); a grinding wheel (9) provided on the movable base (7) in such a manner as to be capable of being lifted or lowered with respect to the movable base (7); a resiliently pressing means (15) for resiliently pressing the grinding wheel (9) against a film layer (14); and a detecting means (17) for detecting the lifted or lowered position of the grinding wheel (9) with respect to the movable base (7).

16 Claims, 6 Drawing Sheets

U.S. PATENT DOCUMENTS

| | | | |
|---|---|---|---|
| 4,528,780 A * | 7/1985 | Halberschmidt et al. ...... | 451/14 |
| 4,587,769 A * | 5/1986 | Cathers ...................... | 451/21 |
| 4,658,550 A | 4/1987 | Myers et al. | |
| 4,716,686 A | 1/1988 | Lisec | |
| 4,744,176 A * | 5/1988 | Sack et al. ..................... | 451/5 |
| 5,146,715 A * | 9/1992 | Bando ........................ | 451/11 |
| 5,413,263 A * | 5/1995 | Bando ....................... | 225/96.5 |
| 5,449,312 A | 9/1995 | Lisec ............................ | 451/5 |
| 5,558,557 A * | 9/1996 | Dashevsky .................. | 451/10 |
| 5,616,064 A | 4/1997 | Bando | |
| 5,718,615 A * | 2/1998 | Boucher et al. ................ | 451/5 |
| 5,810,642 A * | 9/1998 | Bando .......................... | 451/5 |
| 5,873,773 A * | 2/1999 | Bando ........................ | 451/70 |
| 5,934,982 A * | 8/1999 | Vianello et al. .............. | 451/44 |
| 6,336,849 B1 * | 1/2002 | Konnemann ................ | 451/259 |

FOREIGN PATENT DOCUMENTS

| | | |
|---|---|---|
| DE | 90 04 145.3 | 7/1990 |
| DE | 296 15 085 U1 | 1/1997 |
| DE | 196 32 240 A1 | 11/1997 |
| DE | 403 911 B | 6/1998 |
| EP | 0 465 675 A1 | 1/1992 |
| EP | 0 709 348 A1 | 5/1996 |
| EP | 0 769 348 A1 | 4/1997 |
| EP | 0 846 525 A1 | 6/1998 |
| EP | 0 517 176 A1 | 7/2000 |
| EP | 1076 044 A1 | 2/2001 |
| EP | 1 164 111 A2 | 12/2001 |
| JP | 57-96759 * | 6/1982 |
| JP | 7-126027 | 5/1995 |
| JP | 07-223830 | 8/1995 |
| JP | 09-263417 | 10/1997 |
| JP | 2001-240421 | 9/2001 |

OTHER PUBLICATIONS

"Bottero" Catalogue, Cuneo, Italy, 2000.
"Bystronic" Catalogue, Butzberg, Switzerland, Oct. 1994.
Supplementary European Search Report for EP 02 72 4655, completed Dec. 19, 2005, 2 pages.

* cited by examiner

GLASS-PLATE WORKING APPARATUS

The present application is a 371 U.S. national phase of PCT/JP02/04320, filed Apr. 30, 2002, which designated the U.S.

TECHNICAL FIELD

The present invention relates to a glass-plate working apparatus such as an apparatus for removing a film layer on a glass plate for removing a film layer formed on one surface of a glass plate which is used as laminated glass or the like for a window of an automobile or as double glazing or the like for a window of a general building, and an apparatus for forming a cut line on a glass plate for forming a cut line for bend-breaking on one surface of a glass plate which is used as window glass or the like for an automobile or as window glass or the like for a general building.

BACKGROUND ART

Laminated glass having the function of shielding heat rays, ultraviolet rays, or the like is formed such that film layers for shielding heat rays, ultraviolet rays, or the like are respectively formed on respective one surface of two glass plates by sputtering (metallic deposition) and are inwardly opposed to each other, and pressure, heat, and the like are applied to the two glass plates with a polyvinyl butyral sheet placed therebetween, thereby bonding the film layers and the polyvinyl butyral sheet. However, since the film layers and the polyvinyl butyral sheet are difficult to bond to each other, the state of their bonding is likely to become incomplete, and moisture, air, and the like can possibly enter peripheral portions of the laminated glass where the state of bonding is incomplete. Consequently, the polyvinyl butyral sheet becomes oxidized and undergoes color development and change. Accordingly, the film layers at the peripheral portions are removed, and the glass plates and the polyvinyl butyral sheet, which are easily bonded to each other, are bonded to each other.

Meanwhile, double glazing having the function of shielding heat rays, ultraviolet rays, or the like is formed such that film layers are respectively formed on respective one surface of two glass plates and are inwardly opposed to each other, and in order to obtain a hermetically sealed state between them, spacers are inserted between and bonded to the two glass plates at their peripheral portions by means of a pressure-sensitive adhesive elastic material (hereafter referred to as butyl rubber) formed of butyl and Thiokol. However, since the film layers and the butyl rubber are difficult to bond to each other, the state of their bonding is likely to become incomplete, and moisture and the like can possibly enter those portions where the state of bonding is incomplete, making it impossible to maintain the hermetically sealed state. Consequently, the heat insulating effect deteriorates appreciably, and water droplets and the like can occur on the film layers. Therefore, the film layers at the peripheral portions are removed, and the glass plates and the butyl rubber, which are easily bonded to each other, are bonded to each other.

Incidentally, in a case where the film layer is ground and removed by bringing a grinding wheel into contact with the film layer at the peripheral portions of the glass plate by means of resiliency and by rotating this grinding wheel and moving the grinding wheel itself, if an attempt is made to remove the film layer reliably up to an edge portion of the glass plate, it is inevitable to move the grinding wheel up until it has passed the edge portion of the glass plate. However, if the grinding wheel passes the edge portion of the glass plate, the grinding wheel is lowered by the resiliency with which the grinding wheel is resiliently urged, and the grinding wheel is brought into contact with a glass-plate placing surface on which the glass plate is placed. Hence, there is a possibility that the placing surface is undesirably ground unnecessarily.

Such a drawback occurs not only in the apparatus for removing a film layer on a glass plate for removing a film layer formed on one surface of the glass plate, but also in the apparatus for forming a cut line on a glass plate for forming a cut line for bend-breaking on one surface of the glass plate. For example, in the cut-line forming apparatus, a cutter wheel for forming a cut line is brought into contact with the glass-plate placing surface on which the glass plate is placed, and there is a possibility that a cut line is undesirably formed unnecessarily on the glass-plate placing surface.

In addition, the grinding wheel becomes gradually worn due to the grinding of the film layer with respect to the glass plate, and its diameter becomes small. However, if the diameter of the grinding wheel becomes small, the pressing force of the grinding wheel against the glass plate on the basis of the resiliency becomes small, with the result that there is a possibility that the removal of the film layer by the grinding wheel fails to be effected as desired. Therefore, there is a drawback in that the grinding wheel must be replaced at an early stage.

The present invention has been devised in view of the above-described various aspects, and its object is to provide a glass-plate working apparatus which is capable of removing the film layer or forming the cut line reliably up to an edge portion of the glass plate without unnecessarily grinding or cutting the glass-plate placing surface.

Another object of the present invention is to provide a glass-plate working apparatus which makes it possible to set the pressing force of the grinding wheel against the glass plate to a desired value even if the diameter of the grinding wheel becomes small due to its wear, thereby making it possible to avoid a decline in the manufacturing efficiency which is ascribable to the operation of replacing the grinding wheel.

DISCLOSURE OF THE INVENTION

The glass-plate working apparatus in accordance with a first aspect of the invention comprises: glass-plate placing means having a glass-plate placing surface for placing a glass plate thereon; a first movable base which is movable along the glass-plate placing surface; first moving means for moving the first movable base along the glass-plate placing surface; a second movable base provided movably on the first movable base so as to be capable of moving toward or away from the glass-plate placing surface; second moving means for moving the second movable base so as to cause the second movable base to move toward or away from the glass-plate placing surface; a working tool provided on the second movable base in such a manner as to be capable of being lifted or lowered with respect to the second movable base; resiliently pressing means for resiliently pressing the working tool against one surface of the glass plate; and detecting means for detecting a lifted or lowered position of the working tool with respect to the second movable base, wherein the operation of the second moving means is controlled on the basis of detection by the detecting means.

In the glass-plate working apparatus in accordance with the first aspect, it is possible to avoid the abutment of the working tool against the glass-plate placing surface by moving the second movable base away from the glass-plate placing surface by the second moving means upon detection by the detecting means for detecting a lifted or lowered position of the working tool with respect to the second movable base, e.g., upon detection of the lowering of the working tool below a predetermined position with respect to the second movable base on the basis of the passing of the working tool past the edge portion of the glass plate. It is thereby possible to effect working such as the removal of the film layer or the formation of a cut line reliably up to the edge portion of the glass plate without unnecessarily effecting working such as the grinding or cutting of the glass-plate placing surface. In addition, for example, in removing the film layer with respect to the glass plate newly placed on the glass-plate placing surface, while the second movable base is being lowered by the second moving means, the operation of causing the second movable base to approach the glass-plate placing surface by the second moving means is stopped upon detection by the detecting means of the lifting of the grinding wheel above a predetermined position with respect to the second movable base, which is caused by the abutment of the grinding wheel serving as the working tool against the glass plate. The grinding wheel can be thereby made to abut against the glass plate with a predetermined pressing force even if the diameter of the grinding wheel has become small. Hence, the film layer can be removed, as desired, even with the grinding wheel whose diameter has become small due to wear, thereby making it possible to avoid a decline in the manufacturing efficiency which is ascribable to the operation of replacing the grinding wheel.

As in the glass-plate working apparatus in accordance with a second aspect of the invention, the working tool is preferably a grinding wheel for removing a film layer formed on at least one surface of the glass plate, in which case the glass-plate working apparatus further comprises: rotating means for rotating the grinding wheel. As in the glass-plate working apparatus in accordance with a third aspect of the invention, the operation of such rotating means may preferably be adapted to be controlled on the basis of detection by the detecting means.

In addition, as in the glass-plate working apparatus in accordance with a fourth aspect of the invention, the working tool may be a cutter wheel for forming a cut line for bend-breaking on one surface of the glass plate.

As in the glass-plate working apparatus in accordance with a fifth aspect of the invention, the second moving means is preferably adapted to stop the operation of causing the second movable base to approach the glass-plate placing surface upon detection by the detecting means of the lifting of the working tool above a predetermined position with respect to the second movable base. Further, as in the glass-plate working apparatus in accordance with a sixth aspect of the invention, the second moving means is preferably adapted to stop the operation of causing the second movable base to move away from the glass-plate placing surface upon detection by the detecting means of the lowering of the working tool below a predetermined position with respect to the second movable base. Furthermore, as in the glass-plate working apparatus in accordance with a seventh aspect of the invention, the second moving means is preferably adapted to cause the second movable base to move away from the glass-plate placing surface upon detection by the detecting means of the lowering of the working tool below a predetermined position with respect to the second movable base.

The glass-plate working apparatus in accordance with an eighth aspect of the invention comprises: glass-plate placing means having a glass-plate placing surface for placing a glass plate thereon; a first movable base which is movable along the glass-plate placing surface; first moving means for moving the first movable base along the glass-plate placing surface; a second movable base provided movably on the first movable base so as to be capable of moving toward or away from the glass-plate placing surface; second moving means for moving the second movable base so as to cause the second movable base to move toward or away from the glass-plate placing surface; a working tool provided on the second movable base in such a manner as to be capable of being lifted or lowered with respect to the second movable base; rotating means for rotating the working tool; resiliently pressing means for resiliently pressing the working tool against one surface of the glass plate; and detecting means for detecting a lifted or lowered position of the working tool with respect to the second movable base, wherein the working tool is a grinding wheel for removing a film layer formed on at least one surface of the glass plate, and the operation of the rotating means is adapted to be controlled on the basis of detection by the detecting means.

According to the glass-plate working apparatus in accordance with the eighth aspect, the operation of the rotating means is adapted to be controlled on the basis of detection by the detecting means for detecting the lifted or lowered position of the grinding wheel with respect to the second movable base. Therefore, the rotation of the grinding wheel by the rotating means is stopped upon detection of the lowering of the grinding wheel below a predetermined position with respect to the second movable base on the basis of, for example, the passing of the grinding wheel past the edge portion of the glass plate. Therefore, even if the grinding wheel abuts against the glass-plate placing surface, the glass-plate placing surface is not ground unnecessarily, and it is possible to remove the film layer reliably up to the edge portion of the glass plate.

In the glass-plate working apparatus in accordance with the eighth aspect, as in the glass-plate working apparatus in accordance with a ninth aspect of the invention, the rotating means may be adapted to stop the operation of rotating the grinding wheel upon detection by the detecting means of the lowering of the working tool below a predetermined position with respect to the second movable base.

In the invention, as in the glass-plate working apparatus in accordance with a 10th aspect, the apparatus may further comprise: working-tool supporting means interposed between the second movable base and the working tool and provided on the second movable base so as to be capable of being lifted or lowered with respect to the second movable base, wherein the working tool may be provided on the second movable base so as to be capable of being lifted or lowered with respect to the second movable base through the working-tool supporting means.

In the glass-plate working apparatus in accordance with the 10th aspect, as in the glass-plate working apparatus in accordance with an 11th aspect of the invention, the resiliently pressing means is preferably interposed between the second movable base and the working-tool supporting means.

It should be noted that in the case where the working tool is a grinding wheel, the rotating means may be interposed between the grinding wheel and the working-tool supporting means.

In the glass-plate working apparatus in accordance with the 10th or 11th aspect, as in the glass-plate working apparatus in accordance with a 12th aspect of the invention, the detecting means is preferably adapted to detect the lifted or lowered position of the working tool with respect to the second movable base by detecting a lifted or lowered position of the working-tool supporting means with respect to the second movable base.

In the glass-plate working apparatus in accordance with any one of the first to the 12th aspects, as in the glass-plate working apparatus in accordance with a 13th aspect of the invention, the apparatus may further comprise: orienting means for orienting the working tool in a direction of movement of the first movable base by the first moving means.

In the glass-plate working apparatus in accordance with the 13th aspect, as in the glass-plate working apparatus in accordance with a 14th aspect of the invention, the orienting means is preferably adapted to orient the working tool in the direction of movement of the first movable base by the first moving means by swiveling the working tool about a vertical axis. In the glass-plate working apparatus in accordance with the 14th aspect, as in the glass-plate working apparatus in accordance with a 15th aspect of the invention, the working tool may be disposed so as to resiliently press the glass plate on the vertical axis or in a vicinity thereof.

In the glass-plate working apparatus in accordance with any one of the first to the ninth aspects; as in the glass-plate working apparatus in accordance with a 16th aspect of the invention, the apparatus may further comprise: working-tool supporting means interposed between the second movable base and the working tool and provided on the second movable base so as to be capable of being lifted or lowered with respect to the second movable base; and orienting means for orienting the working tool in the direction of movement of the first movable base by the first moving means, wherein the working tool may be provided on the second movable base so as to be capable of being lifted or lowered with respect to the second movable base through the working-tool supporting means, and the orienting means may be adapted to orient the working tool in the direction of movement of the first movable base by the first moving means by swiveling the working-tool supporting means about the vertical axis.

In the glass-plate working apparatus in accordance with the 16th aspect, as in the glass-plate working apparatus in accordance with a 17th aspect of the invention, the resiliently pressing means is preferably interposed between the second movable base and the working-tool supporting means. In the glass-plate working apparatus in accordance with the 16th or 17th aspect, as in the glass-plate working apparatus in accordance with an 18th aspect of the invention, the detecting means may be adapted to detect the lowering of the working tool below a predetermined position by detecting the lowering of the working-tool supporting means below a predetermined position. In the glass-plate working apparatus in accordance with any one of the 16th to 18th aspects, as in the glass-plate working apparatus in accordance with a 19th aspect of the invention, the working tool may be disposed so as to resiliently press the glass plate on the vertical axis or in a vicinity thereof. In addition, in the glass-plate working apparatus in accordance with any one of the 16th to 19th aspects, as in the glass-plate working apparatus in accordance with a 20th aspect of the invention, the detecting means is preferably adapted to detect the lifted or lowered position of the working tool with respect to the second movable base by detecting the lifted or lowered position of the working-tool supporting means with respect to the second movable base.

In the glass-plate working apparatus in accordance with the above-described various aspects, as the resiliently pressing means, an air cylinder unit is preferred which is capable of setting, as desired, the resiliently pressing force at the working position of the working tool. However, the invention is not limited to the same, and the resiliently pressing means using a coil spring, for instance, may be used. In addition, in the case where the air cylinder unit is used as the resiliently pressing means, the working tool may be lifted with respect to the first and second movable bases so as to avoid unnecessary grinding or cutting of the glass-plate placing surface by the working tool by controlling the operation of the air cylinder unit on the basis of detection by the detecting means.

In accordance with the invention, it is possible to provide a glass-plate working apparatus, such as an apparatus for removing a film layer on a glass plate or an apparatus for forming a cut line on a glass plate, which is capable of removing the film layer or forming the cut line reliably up to an edge portion of the glass plate without unnecessarily grinding or cutting the glass-plate placing surface.

Next, a description will be given of the invention and its embodiment with reference to a preferred example illustrated in the drawings. It should be noted that the invention is not limited to the example.

BEST MODE FOR CARRYING OUT THE INVENTION

Figure 1:
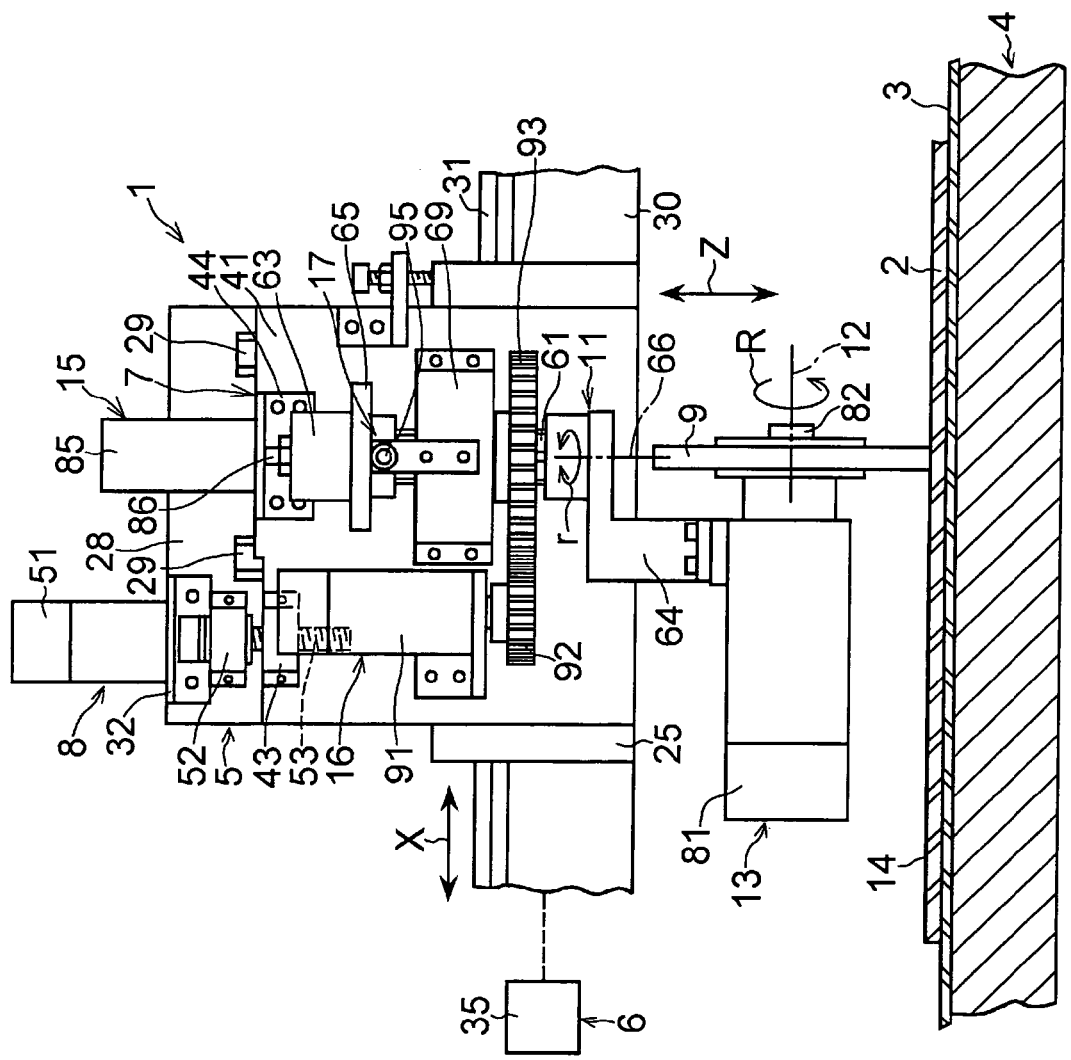
FIG. 1 is an explanatory front elevational view of a preferred embodiment of the invention.
Figure 2:
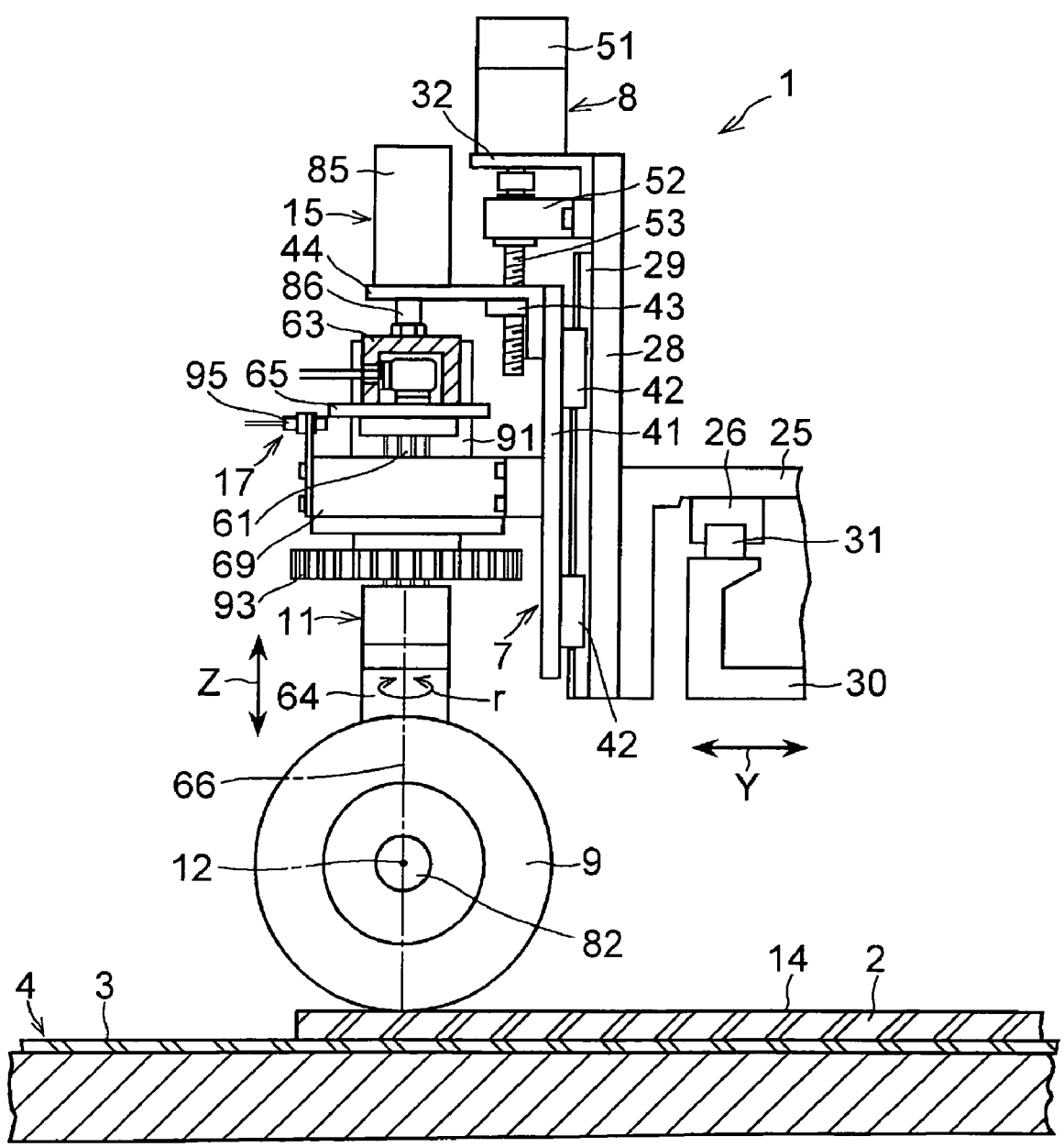
FIG. 2 is an explanatory right side view of the embodiment shown in FIG. 1.
Figure 3:
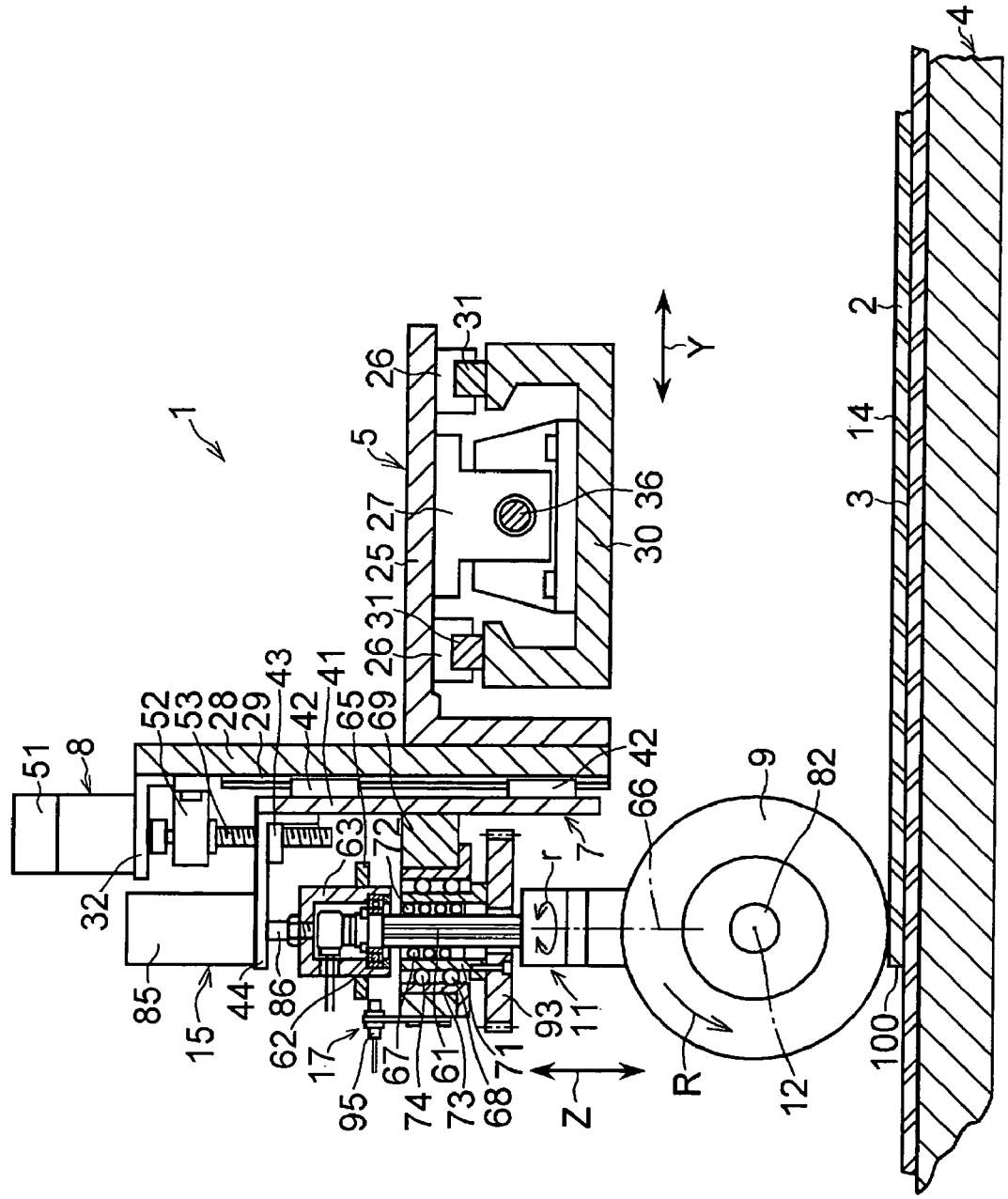
FIG. 3 is an explanatory right side view, partly in section, of the embodiment shown in FIG. 1.
Figure 4:
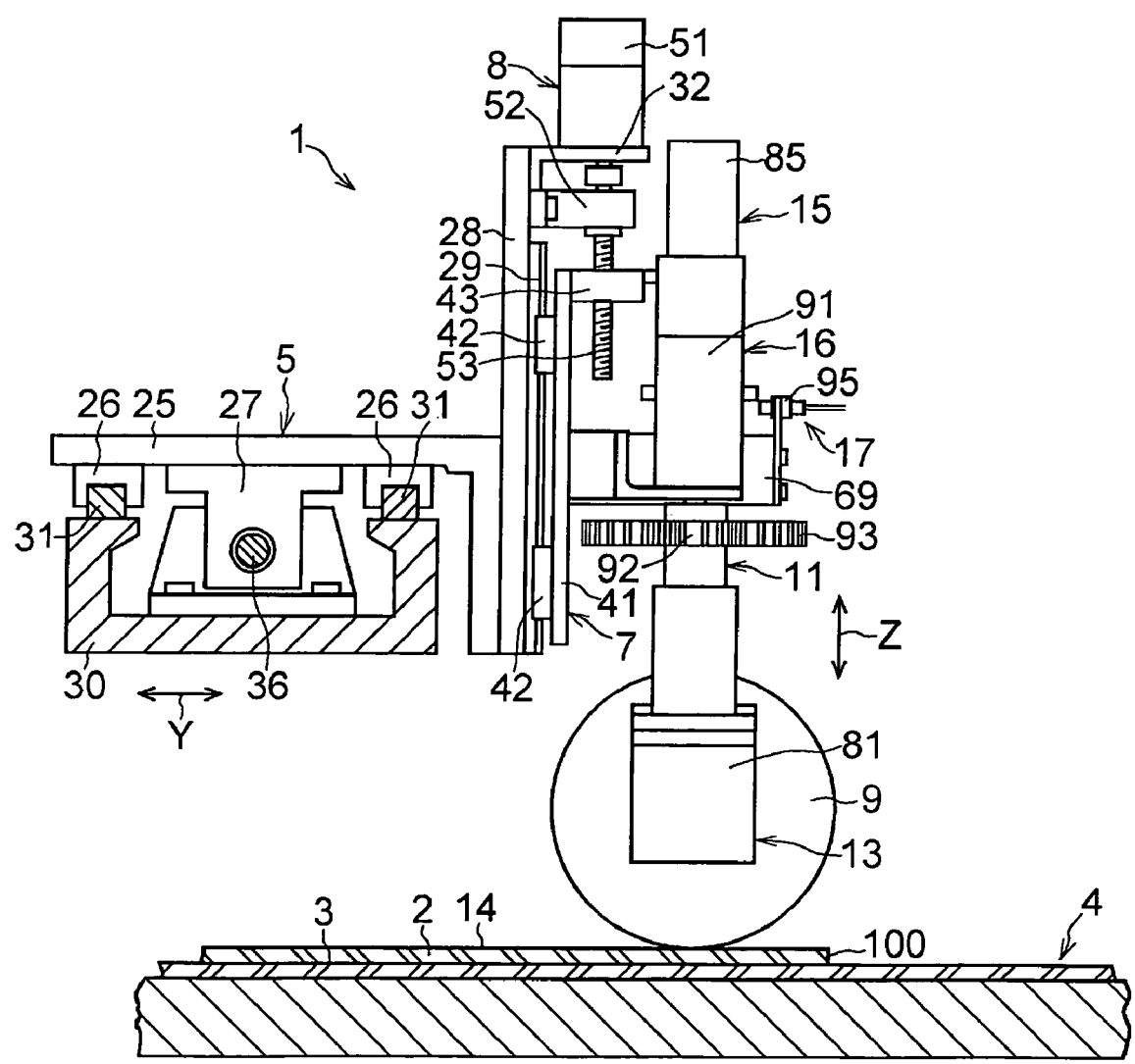
FIG. 4 is an explanatory left side view of the embodiment shown in FIG. 1.

In FIGS. 1 to 4, an apparatus 1 for removing a film layer on a glass plate in accordance with this embodiment serving as a glass-plate working apparatus is comprised of: a glass-plate placing means 4 having a glass-plate placing surface 3 for placing a glass plate 2 thereon; a movable base 5 which is movable in an X direction and a Y direction along the glass-plate placing surface 3 above the glass-plate placing surface 3; a moving means 6 for moving the movable base 5 in the X direction and the Y direction along the glass-plate placing surface 3 above the glass-plate placing surface 3; a movable base 7 provided on the movable base 5 in such a manner to be movable in a Z direction so as to be capable of moving toward or away from the glass-plate placing surface 3; a moving means 8 for moving the movable base 7 in the Z direction so as to cause the movable base 7 to move toward or away from the glass-plate placing surface 3; a grinding wheel 9 serving as a working tool and provided on the movable base 7 in such a manner as to be capable of being lifted or lowered with respect to the movable base 7; a grinding-wheel supporting means 11 interposed between the movable base 7 and the grinding wheel 9 and serving as a working-tool supporting means provided on the movable base 7 in such a manner as to be capable of being lifted or lowered with respect to the movable base 7; a rotating means 13 interposed between the grinding wheel 9 and the grinding-wheel supporting means 11 and adapted to rotate the grinding wheel 9 in an R direction about its axis 12; a resiliently pressing means 15 interposed between the movable base 7 and the grinding wheel supporting means 11 for resiliently pressing the grinding wheel 9 against a film layer 14 formed on one surface of the glass plate 2 by lowering the grinding wheel 9 with respect to the movable base 7; an orienting means 16 for orienting the grinding wheel 9 in the direction of movement of the movable base 5 by the moving means 6; and a detecting means 17 for detecting the lifted or lowered position of the grinding wheel 9 with respect to the movable base 7.

The glass-plate placing means 4 has a fixed base 21 and a sheet 22 formed of a relatively hard material and secured to an upper surface of the fixed base 21 so as not to damage the other surface of the glass plate 2 which is placed. One surface of the sheet 22 serves as the glass-plate placing surface 3.

The movable base 5 includes a movable base body 25; a pair of sliders 26 and a nut 27 which are secured to a lower surface of the movable base body 25; a vertical base plate 28 secured to a side surface of the movable base body 25; a pair of rails 29 secured to a side surface of the vertical base plate 28 and extending in the Z direction; and a bracket 32 secured to the side surface of the movable base body 25. The sliders 26 are respectively fitted to a pair of rails 31 provided on a frame 30 extending in the X direction such that the sliders 26 are slidable in the X direction. The movable base 5 is thereby movable in the X direction. The frame 30 is also fitted to unillustrated rails extending on the fixed base 21 in the Y direction such that the frame 30 is slidable in the Y direction by means of sliders. The movable base 5 is thereby movable in the Y direction as well through the frame 30.

The moving means 6 has an X-direction moving mechanism 35 and a Y-direction moving mechanism (not shown). The X-direction moving mechanism 35 has an electric motor (not shown) mounted on the frame 30, as well as a screw shaft 36 which is connected to an output rotating shaft of the electric motor and is supported rotatably by the frame 30, and which is threadedly-engaged with the nut 27. The arrangement provided is such that as the electric motor is operated, the screw shaft 36 is rotated by the rotation of an output rotating shaft of the motor, thereby moving the movable base 5 in the X direction. The Y-direction moving mechanism is arranged in the same way as the X-direction moving mechanism 35, and has an electric motor (not shown) mounted on the fixed base 21, as well as a screw shaft (not shown) which is connected to an output rotating shaft of the electric motor and is supported rotatably by the fixed base 21, and which is threadedly engaged with a nut (not shown) of the frame 30. The arrangement provided is such that as the electric motor is operated, the screw shaft is rotated by the rotation of an output rotating shaft of the motor, thereby moving the frame 30 in the Y direction.

As the X-direction moving mechanism 35 and the Y-direction moving mechanism are operated, the moving means 6 is adapted to move the movable base 5 above the glass-plate placing surface 3 in the X and Y directions and also to move the grinding wheel 9 in the X and Y directions.

The movable base 7 includes a movable base body 41; a pair of sliders 42 secured to a side surface of the movable base body 41; a nut 43 secured to the other side surface of the movable base body 41; a bracket 44 secured to the other side surface of the movable base body 41, and a supporting member 69 secured to the other side surface of the movable base body 41. The sliders 42 are respectively fitted to the pair of rails 29 in such a manner as to be slidable in the Z direction. The movable base 7 is thereby movable in the Z direction.

The moving means 8 has an electric motor 51 mounted on the bracket 32, as well as a screw shaft 53 which is connected to an output rotating shaft of the electric motor 51 and is supported rotatably by the side surface of the vertical base plate 28 through a bearing 52, and which is threadedly engaged with the nut 43. The arrangement provided is such that as the electric motor 51 is operated, the screw shaft 53 is rotated by the rotation of an output rotating shaft of the motor 51, thereby moving the movable base 7 in the Z direction.

The grinding-wheel supporting means 11 includes a spline shaft 61; a hollow connecting member 63 connected to an upper end portion of the spline shaft 61 through a bearing 62 so as to be relatively rotatable in an r direction about a vertical axis 66; an L-shaped connecting member 64 having one end portion secured to a lower end portion of the spline shaft 61; and a collar portion 65 secured to the connecting member 63. The spline shaft 61 is supported by the supporting member 69 through bearings 67 and 68 so as to be movable in the Z direction and to be rotatable in the r direction about the vertical axis 66.

The bearing 67 has balls 72 which are arranged so as to be fitted in grooves formed in an inner peripheral surface of a hollow cylindrical member 71 as an outer ring, through which the spline shaft 61 passes, in such a manner as to extend in the Z direction and in grooves formed in an outer surface of the spline shaft 61 in such a manner as to extend in the Z direction. The bearing 67 supports the spline shaft 61 by means of the balls 72 with respect to the hollow cylindrical member 71 so as to allow the spline shaft 61 to be movable in the Z direction. The bearing 68 has balls 74 disposed between an outer ring 73 and the hollow cylindrical member 71 serving as an inner ring. The bearing 68 supports the spline shaft 61 by means of the balls 74 with respect to the outer ring 73 so as to allow the spline shaft 61 to be rotatable in the r direction about the vertical axis 66, and the outer ring 73 is secured to the supporting member 69.

The grinding wheel 9 is disposed on the vertical axis 66 or in its vicinity so as to resiliently press the film layer 14.

The rotating means 13 has an air motor 81 secured to a lower end portion of the L-shaped connecting member 64 of the grinding-wheel supporting means 11. The grinding wheel 9 is attached to an output rotating shaft 82 of the air motor 81. The rotating means 13 is adapted to rotate the grinding wheel 9 in the R direction as the air motor 81 is operated.

The grinding wheel 9 which is connected to the lower end portion of the L-shaped connecting member 64 through the air motor 81 is provided on the movable base 7 so as to be capable of being lifted or lowered with respect to the movable base 7 through the spline shaft 61 of the grinding-wheel supporting means 11.

The resiliently pressing means 15 has an air cylinder unit 85, and the connecting member 63 is attached to a piston rod 86 of the air cylinder unit 85. The resiliently pressing means 15 resiliently urges the grinding wheel 9 downward by means of the connecting member 63, the spline shaft 61, the L-shaped connecting member 64, and the air motor 81 through the pneumatic resiliency generated by the air cylinder unit 85. When the movable base 7 is being lifted by the moving means 8, the lower end surface of the connecting member 63 is adapted to come into contact with the supporting member 69 by the pneumatic resiliency generated by the air cylinder unit 85.

The orienting means 16 includes an electric motor 91 mounted on the movable base body 41; a pinion 92 secured to an output rotating shaft of the electric motor 91, and a gear 93 meshing with the pinion 92 and secured to the hollow cylindrical member 71.

The orienting means 16 is so arranged that as the pinion 92 is rotated by the rotation of the output rotating shaft of the electric motor 91 caused by the operation of the electric motor 91, the rotation of the pinion 92 rotates the spline shaft 61 in the r direction about the vertical shaft 66 through the gear 93, the hollow cylindrical member 71, and the balls 72. Further, the rotation of the spline shaft 61 in the r direction swivels the grinding wheel 9 in the r direction about the vertical axis 55 through the L-shaped connecting member 64 and the air motor 81, thereby orienting the grinding wheel 9 in the direction of movement of the movable base 5 by the moving means 6.

The detecting means 17 has a non-contacting sensor 95 attached to the supporting member 69. The non-contacting sensor 95 is adapted to detect the position in the Z direction of the collar portion 65 and detect the lifted or lowered position of the grinding-wheel supporting means 11 with respect to the movable base 7, to thereby detect the lifted or lowered position of the grinding wheel 9 with respect to the movable base 7.

As will be described below, the operation of the moving means 8 and the rotating means 13 is controlled on the basis of detection by the detecting means 17.

Figure 5:
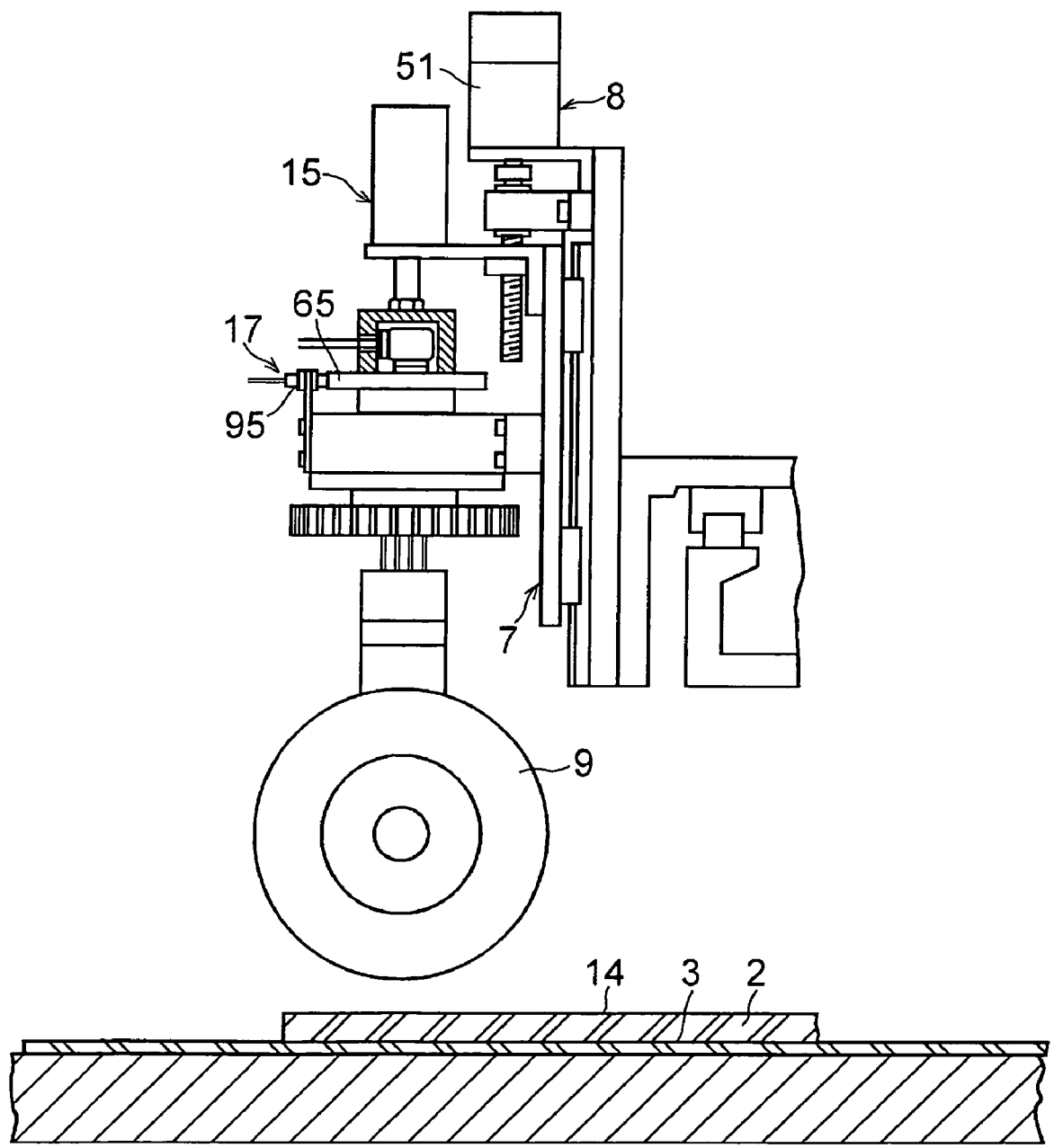
FIG. 5 is a diagram explaining the operation of the embodiment shown in FIG. 1.

In the above-described apparatus 1 for removing a film layer on a glass plate, the state before the film layer 14 of a new glass plate 2 is removed by grinding is such that, as shown in FIG. 5, the collar portion 65 has been detected by the detecting means 17, and the grinding wheel 9 has been lifted and moved to a position moved away from the glass-plate placing surface 3 by the moving means 8. If the electric motor 51 and the air motor 81 of the moving means 8 and the rotating means 13 are operated in this state, the grinding wheel 9 is lowered and made to approach the glass-plate placing surface 3. When the grinding wheel 9 thus begins to come into contact with the film layer 14 of the glass plate 2, the grinding wheel 9 is, conversely, relatively lifted with respect to the movable base 7. When the resiliently pressing force of the grinding wheel 9 against the film layer 14 of the glass plate 2 by the resiliently pressing means 15 reaches a predetermined value, it becomes impossible for the collar portion 65 to be detected by the detecting means 17, as shown in FIGS. 1 to 4. When the rise of the collar portion 65 is thereby detected by the detecting means 17, the operation of the electric motor 51 is stopped. Meanwhile, the electric motor of the moving means 6 is operated to begin moving the movable base 5 in the X and Y directions above the glass-plate placing surface 3. Thus, in this embodiment, as the rise of the grinding wheel 9 from the predetermined position with respect to the movable base 7 is detected by the detecting means 17, the moving means 8 is adapted to stop the operation of causing the movable base 7 to approach the glass-plate placing surface 3.

Further, with the apparatus 1 for removing a film layer on a glass plate, as the movable base 5 is moved in the X and Y directions by the preprogrammed operation of the electric motor of the moving means 6, the film layer 14 in a desired region of the glass plate 2 is ground and removed by the rotating grinding wheel 9. When the grinding and removal of the film layer 14 in all the predetermined region are completed, the operation of the air motor 81 and the electric motor of the moving means 6 are stopped. Meanwhile, the electric motor 51 is operated again to lift the movable base 7, which in turn causes the grinding wheel 9 to move away from the glass plate 2, and a gap is created between the grinding wheel 9 and the glass plate 2. However, as a result of the fact that the spline shaft 61 is urged downward by the pneumatic resiliency of the air cylinder 85, the spline shaft 61 relatively moves downward with respect to the movable base 7. Then, when the approaching of the collar portion 65 is detected by the detecting means 17, the operation of the electric motor 51 is stopped upon detection of the collar portion 65 by the detecting means 17, so that the grinding wheel 9 is brought to a standstill at the position shown in FIG. 5. Thus, the detecting means 17 detects the lowering of the grinding wheel 9 below a predetermined position by detecting the lowering of the grinding-wheel supporting means 11 below a predetermined position. In this embodiment, the detecting means 17 detects the lowered position of the grinding wheel 9 with respect to the movable base 7 by detecting the lowered position of the grinding-wheel supporting means 11 with respect to the movable base 7. The moving means 8 is adapted to stop the operation of moving the movable base 7 away from the glass-plate placing surface 3 upon detection by the detecting means 17 of the lowering of the grinding wheel 9 below a predetermined position with respect to the movable base 7, i.e., in this embodiment, upon detection by the detecting means 17 of the lowering of the grinding wheel 9 to a predetermined position with respect to the movable base 7.

Figure 6:
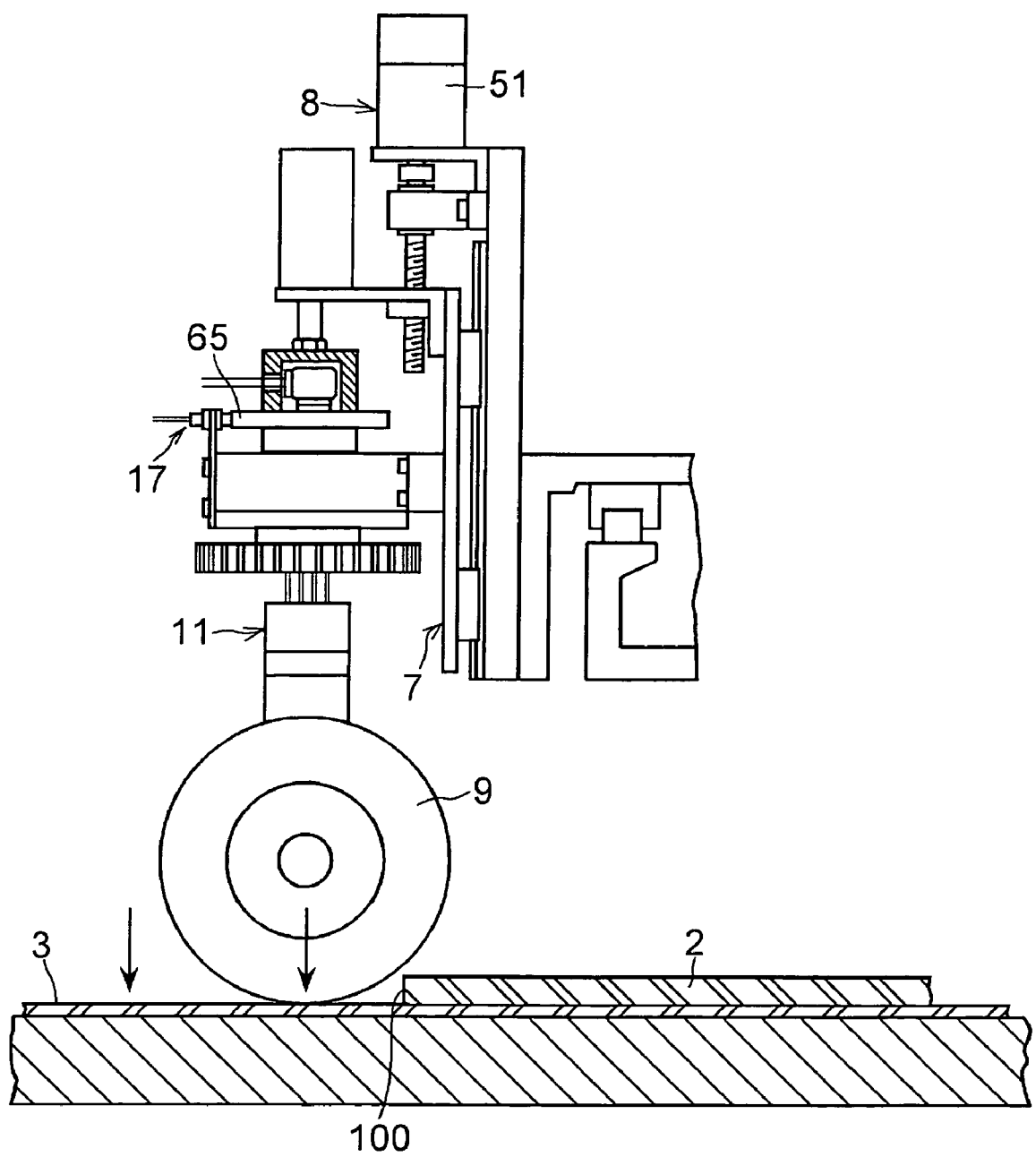
FIG. 6 is another diagram explaining the operation of the embodiment shown in FIG. 1.

Incidentally, with the apparatus 1 for removing a film layer on a glass plate, during the grinding of the film layer 14 of the glass plate 2 by the grinding wheel 9, the grinding wheel 9 moves past an edge portion 100 of the glass plate 2, and the grinding wheel 9 is lowered by being urged by the air cylinder unit 85, as shown in FIG. 6. Thereupon, the approaching of the collar portion 65 is detected by the detecting means 17. If the approaching of the collar portion 65 is thus detected by the detecting means 17 during the grinding of the film layer 14, the operation of the air motor 81 is stopped, and the electric motor 51 is operated to raise the movable base 7, thereby avoiding the abutment of the grinding wheel 9 against the glass-plate placing surface 3. Thus, with the apparatus 1 for removing a film layer on a glass plate, the detecting means 17 is adapted to detect the lowering of the grinding wheel 9 below a predetermined position by detecting the lowering of the grinding-wheel supporting means 11 below a predetermined position. Further, the moving means 8 is adapted to move the movable base 7 away from the glass-plate placing surface 3 upon detection by the detecting means 17 of the lowering of the grinding wheel 9 below a predetermined position with respect to the movable base 7. Furthermore, the rotating means 13 is adapted to stop the operation of rotating the grinding wheel 9 upon detection by the detecting means 17 of the lowering of the grinding wheel 9 below a predetermined position with respect to the movable base 7. It should be noted that, in this case, the stopping of the operation of rotating the grinding wheel 9 by the rotating means 13 may not be effected, and only the operation of moving the movable base 7 away from the glass-plate placing surface 3 by the moving means 8 may be effected. Still alternatively, the operation of moving the movable base 7 away from the glass-plate placing surface 3 by the moving means 8 may not be effected, and only the stopping of the operation of rotating the grinding wheel 9 by the rotating means 13 may be effected.

With the apparatus 1 for removing a film layer on a glass plate, the movable base 7 is moved away from the glass-plate placing surface 3 by the moving means 8 upon detection by the detecting means 17 for detecting the lifted or lowered position of the grinding wheel 9 with respect to the movable base 7, e.g., upon detection of the lowering of the grinding wheel 9 below a predetermined position with respect to the movable base 7 on the basis of the passing of the grinding wheel 9 past the edge portion 100 of the glass plate 2. It is thereby possible to avoid the abutment of the grinding wheel 9 against the glass-plate placing surface 3, and the film layer 14 can be removed reliably up to the edge portion 100 of the glass plate 2 without unnecessarily grinding the glass-plate placing surface 3. For example, in removing the film layer 14 with respect to the glass plat 2 newly placed on the glass-plate placing surface 3, while the movable base 7 is being lowered by the moving means 8, the operation of causing the movable base 7 to approach the glass-plate placing surface 3 by the moving means 8 is stopped upon detection by the detecting means 17 of the lifting of the grinding wheel 9 above a predetermined position with respect to the movable base 7, which is caused by the abutment of the grinding wheel 9 against the glass plate 2. The grinding wheel 9 can be thereby made to abut against the glass plate 2 with a predetermined pressing force even if the diameter of the grinding wheel 9 has become small. Hence, the film layer 14 can be removed, as desired, even with the grinding wheel 9 whose diameter has become small due to wear, thereby making it possible to avoid a decline in the manufacturing efficiency which is ascribable to the operation of replacing the grinding wheel 9.

It should be noted that, at the time of forming a cut line for bend-breaking on the glass plate 2, it suffices if a cutter wheel, instead of the grinding wheel 9, is rotatably attached at an extended lower end portion of the spline shaft 61 or at a lower end portion of the L-shaped connecting member 64, i.e., at a position equivalent to the position where the output rotating shaft 82 of the air motor 81 is disposed. In this case, the air motor 81 may not be provided.

Although in the above-described embodiment the arrangement provided is such that the operation of the rotating means 13 is also controlled on the basis of detection by the detecting means 17, the present invention is not limited to the same.

The invention claimed is:

1. A glass-plate working apparatus comprising:
    a glass-plate placing means having the glass-plate placing surface for placing a glass plate thereon;
    a first movable base which is movable along the glass-plate placing surface in two directions perpendicular to each other;
    a first moving means for linearly moving said first movable base along the glass-plate placing surface in said two directions;
    a second movable base provided on said first movable base movably in a direction perpendicular to the glass-plate placing surface so as to be capable of moving toward or away from the glass-plate placing surface;
    a second moving means for moving under control said second movable base in a vertical direction perpendicular to the glass-plate placing surface;
    a grinding wheel provided on said second movable base in such a manner as to be capable of being linearly lifted or lowered with respect to said second movable base in a vertical direction and having a perpendicular axis perpendicular to the vertical axis which extends in the same direction as the direction in which said second movable base is moved by said second moving means;
    a rotating means for rotating said grinding wheel about the perpendicular axis;
    a resilient pressing means interposed between said second movable base and said grinding wheel for linearly lowering said grinding wheel with respect to said second movable base along the vertical axis so as to press the grinding wheel resiliently against one surface of the glass plate; and
    an orienting means provided on said second movable base for swiveling said grinding wheel about said vertical axis so as to orient said grinding wheel in a direction of movement of said first movable base by said first moving means, a portion of one surface of the glass-plate on which the grinding wheel abuts and the axis of said grinding wheel being aligned on said vertical axis.

2. The glass-plate working apparatus according to claim 1, further comprising grinding wheel supporting means interposed between said second movable base and said grinding wheel and provided on said second movable base so as to be capable of being lifted or lowered with respect to said second movable base, said grinding wheel being provided on said second movable base so as to be capable of being lifted or lowered with respected to said second movable base through said grinding wheel supporting means.

3. The glass-plate working apparatus according to claim 2, wherein said resilient pressing means is interposed between said second movable base and said grinding wheel supporting means.

4. The glass-plate working apparatus according to claim 1, wherein said second moving means comprises an electric motor for moving said second movable base in the direction perpendicular to the glass-plate placing surface.

5. The glass-plate working apparatus according to claim 1, wherein the grinding wheel is adapted to remove a film layer formed on at least one surface of the glass plate.

6. A glass-plate working apparatus comprising:
    a glass-plate placement structure having a glass-plate placing surface to place a glass plate thereon;
    a first movable base which is movable along the glass-plate placing surface in two directions perpendicular to each other;
    a first movement structure to linearly move said first movable base along the glass-plate placing surface in said two directions;
    a second movable base provided on said first movable base movably in a direction perpendicular to the glass-plate placing surface so as to be capable of moving toward or away from the glass-plate placing surface;
    a second movement structure to move for moving under control said second movable base in a vertical direction perpendicular to the glass-plate placing surface;
    a grinding wheel provided on said second movable base in such a manner as to be capable of being linearly lifted or lowered with respect to said second movable base in a vertical direction and having a perpendicular axis perpendicular to the vertical axis which extends in the same direction as the direction in which said second movable base is moved by said second movement structure;
    a rotating structure to rotate said grinding wheel about the perpendicular axis;
    a resilient pressing structure interposed between said second movable base and said grinding wheel to linearly lower said grinding wheel with respect to said second movable base along the vertical axis so as to press the grinding wheel resiliently against one surface of the glass plate; and
    an orienting structure provided on said second movable base to swivel said grinding wheel about said vertical axis so as to orient said grinding wheel in a direction of movement of said first movable base by said first movement structure, a portion of one surface of the glass-plate on which the grinding wheel abuts and the axis of said grinding wheel being aligned on said vertical axis.

7. The glass-plate working apparatus according to claim 6, wherein the grinding wheel is adapted to remove a film layer formed on at least one surface of the glass plate.

8. The glass-plate working apparatus according to claim 6, further comprising a grinding wheel support interposed between said second movable base and said grinding wheel and provided on said second movable base so as to be capable of being lifted or lowered with respect to said second movable base, said grinding wheel being provided on said second movable base so as to be capable of being lifted or lowered with respected to said second movable base through said grinding wheel support.

9. The glass-plate working apparatus according to claim 8, wherein said resilient pressing structure is interposed between said second movable base and said grinding wheel support.

10. The glass-plate working apparatus according to claim 6, wherein said second movement structure comprises an electric motor for moving said second movable base in the direction perpendicular to the glass-plate placing surface.

11. A glass-plate working apparatus comprising:
glass-plate placing means having a glass-plate placing surface for placing a glass plate thereon;
a first movable base which is movable along the glass-plate placing surface;
first moving means for moving said first movable base along the glass-plate placing surface;
a second movable base provided on said first movable base movably in a direction perpendicular to the glass-plate placing surface so as to be capable of moving toward or away from the glass-plate placing surface;
second moving means for moving said second movable base so as to cause said second movable base to move toward or away in a direction perpendicular to the glass-plate placing surface;
a grinding wheel provided on the second movable base in such a manner as to be capable of being lifted or lowered with respect to said second movable base and having an axis perpendicular to a vertical axis;
rotating means for rotating said grinding wheel about its axis;
resilient pressing means interposed between said second movable base and said grinding wheel for lowering said grinding wheel with respect to said second movable base along the vertical axis extending in the same direction as the direction in which said second movable base is moved by said second moving means so as to press the grinding wheel resiliently against one surface of the glass plate;
grinding-wheel supporting means connecting to the grinding wheel and the resilient pressing means; and
detecting means for detecting a position of the grinding wheel, a connecting line connecting a portion of the grinding wheel abutting one surface of the glass plate with a rotational axial center of the grinding wheel on said axis of the grinding wheel being aligned on said vertical axis, the operation of said second moving means being adapted to control the level of lowering of the grinding wheel on the basis of detection by said detecting means, grinding-wheel supporting means having a collar portion secured to the grinding wheel, and the detecting means having a sensor provided on said second movable base for detecting the position of the grinding-wheel supporting means with respect to the second movable base, said sensor detecting a position of a collar portion of said grinding-wheel supporting means in the vertical direction to thereby detect the lifted or lowered position of the grinding wheel with respect to the second movable base in a state in which the grinding wheel resiliently press the glass plate.

12. The glass-plate working apparatus according to claim 11, wherein said second moving means is adapted to cause the second movable base to move away from the glass-plate placing surface upon detection by said detecting means of the lowering of said grinding wheel below a predetermined position with respect to said second movable base.

13. The glass-plate working apparatus according to claim 11, wherein said second moving means comprises a control motor.

14. The glass-plate working apparatus according to claim 11, further comprising: orienting means for orienting said grinding wheel in a direction of movement of said first movable base by said first moving means.

15. The glass-plate working apparatus according to claim 14, wherein said orienting means is adapted to orient said grinding wheel in the direction of movement of said first movable base by said first moving means by swiveling said grinding wheel about a vertical axis.

16. The glass-plate working apparatus according to claim 15, wherein said grinding wheel is disposed so as to resiliently press the glass plate on the vertical axis.

* * * * *